US012503941B2

(12) United States Patent
Shekhar et al.

(10) Patent No.: US 12,503,941 B2
(45) Date of Patent: Dec. 23, 2025

(54) MEASURING EXTRACTION EFFICIENCY FOR DRILLING FLUID

(71) Applicant: Halliburton Energy Services, Inc., Houston, TX (US)

(72) Inventors: Prashant Shekhar, Cypress, TX (US); Mohamed Saber Abouhussien, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1056 days.

(21) Appl. No.: 17/441,820

(22) PCT Filed: May 30, 2019

(86) PCT No.: PCT/US2019/034635
§ 371 (c)(1),
(2) Date: Sep. 22, 2021

(87) PCT Pub. No.: WO2020/242480
PCT Pub. Date: Dec. 3, 2020

(65) Prior Publication Data
US 2022/0186616 A1 Jun. 16, 2022

(51) Int. Cl.
*E21B 49/08* (2006.01)
*E21B 21/06* (2006.01)
(Continued)

(52) U.S. Cl.
CPC ............ *E21B 49/08* (2013.01); *E21B 21/067* (2013.01); *G01N 30/06* (2013.01); *G01N 33/2823* (2013.01); *G01N 2030/062* (2013.01)

(58) Field of Classification Search
None
See application file for complete search history.

(56) References Cited

U.S. PATENT DOCUMENTS 3,050,449 A * 8/1962 Moore ..................... G01N 1/10
203/92
3,213,594 A * 10/1965 Long ..................... E21B 21/067
96/198
(Continued)

FOREIGN PATENT DOCUMENTS

CN 102928515 A 2/2013
CN 102928518 2/2013
(Continued)

OTHER PUBLICATIONS

Espeacenet Translation of CN 102928522A https://worldwide.espacenet.com/patent/search/family/047643372/publication/CN102928522A?q=CN102928522A (Year: 2013).*
(Continued)

*Primary Examiner* — Brit E. Anbacht
(74) *Attorney, Agent, or Firm* — Kilpatrick Townsend & Stockton, LLP

(57) ABSTRACT

A system includes an extraction system having an inlet channel and an outlet channel to receive fluid and to output processed fluid. The system also includes an extraction device to capture a first sample of fluid from the inlet channel, capture a second sample from the processed fluid from the outlet channel, and extract gas, liquid, or solids from the first sample and further gas, liquid, or solids from the second sample. Additionally, the system includes a gas, liquid, or solids analyzing device useable to analyze the gas, liquid, or solids to determine a first value of a chemical species of interest present in the first sample and to analyze the further gas, liquid, or solids to determine a second value of the chemical species of interest present in the second sample to determine an efficiency of the extraction system using the first value and the second value.

19 Claims, 4 Drawing Sheets

(51) Int. Cl.
  *G01N 30/06*   (2006.01)
  *G01N 33/28*   (2006.01)

(56) References Cited

U.S. PATENT DOCUMENTS

| | | | |
|---|---|---|---|
| 5,090,256 A * | 2/1992 | Issenmann | E21B 49/005 |
| | | | 73/863.23 |
| 5,447,052 A * | 9/1995 | Delaune | G01N 30/06 |
| | | | 73/19.09 |
| 5,648,603 A * | 7/1997 | Hanson | B01D 19/0057 |
| | | | 73/863 |
| 8,011,238 B2 * | 9/2011 | Hanson | G01N 33/2823 |
| | | | 73/19.09 |
| 10,180,062 B2 * | 1/2019 | Pickell | E21B 21/067 |
| 2013/0233057 A1 | 9/2013 | Karoum et al. | |
| 2015/0322783 A1 | 11/2015 | Rowe | |
| 2017/0167257 A1 | 6/2017 | Rowe | |
| 2017/0268333 A1 * | 9/2017 | Pickell | G01N 33/2823 |
| 2022/0186616 A1 * | 6/2022 | Shekhar | G01N 33/2823 |

FOREIGN PATENT DOCUMENTS

| | | | |
|---|---|---|---|
| CN | 102928522 | 2/2013 | |
| WO | WO-2018025059 A1 * | 2/2018 | E21B 21/01 |

OTHER PUBLICATIONS

Office Action, SA521430716, Jul. 9, 2023, 7 pages.
Office Action, SA521430716, Jul. 9, 2023, 4 pages, English Translation.
International Application No. PCT/US2019/034635, International Search Report and Written Opinion, mailed On Feb. 27, 2020, 10 pages.

* cited by examiner

MEASURING EXTRACTION EFFICIENCY FOR DRILLING FLUID

TECHNICAL FIELD

The present disclosure relates to drilling a wellbore for chemical species extraction. More specifically, this disclosure relates to measuring the efficiency of an extraction system used to extract the chemical species, such as hydrocarbons, from drilling fluid.

BACKGROUND

A chemical species extraction system (e.g., a degasser or mud gas separator) can be used to extract gasses from drilling fluid (e.g., drilling mud) during a mud logging operation. Drilling fluid can flow through a wellbore during the drilling process to form a mud column. Hydrocarbons and other chemical species can leak into the drilling fluid during the drilling process, resulting in gas bubbles or other chemical species to be present in the mud column.

When the drilling fluid is circulated to the surface of the wellbore, a mud logging and chemical species extraction system and accompanying analysis equipment can obtain a representative sample of the chemical species of interest, which can be analyzed to determine its composition. Analyzing the chemical species of interest present in the drilling fluid can help define characteristics of fluids within a reservoir to determine viability of a wellbore. An inefficient or malfunctioning extraction system can impact a chemical analysis and cause inaccurate depictions of the viability of a wellbore.

DETAILED DESCRIPTION

Figure 1:
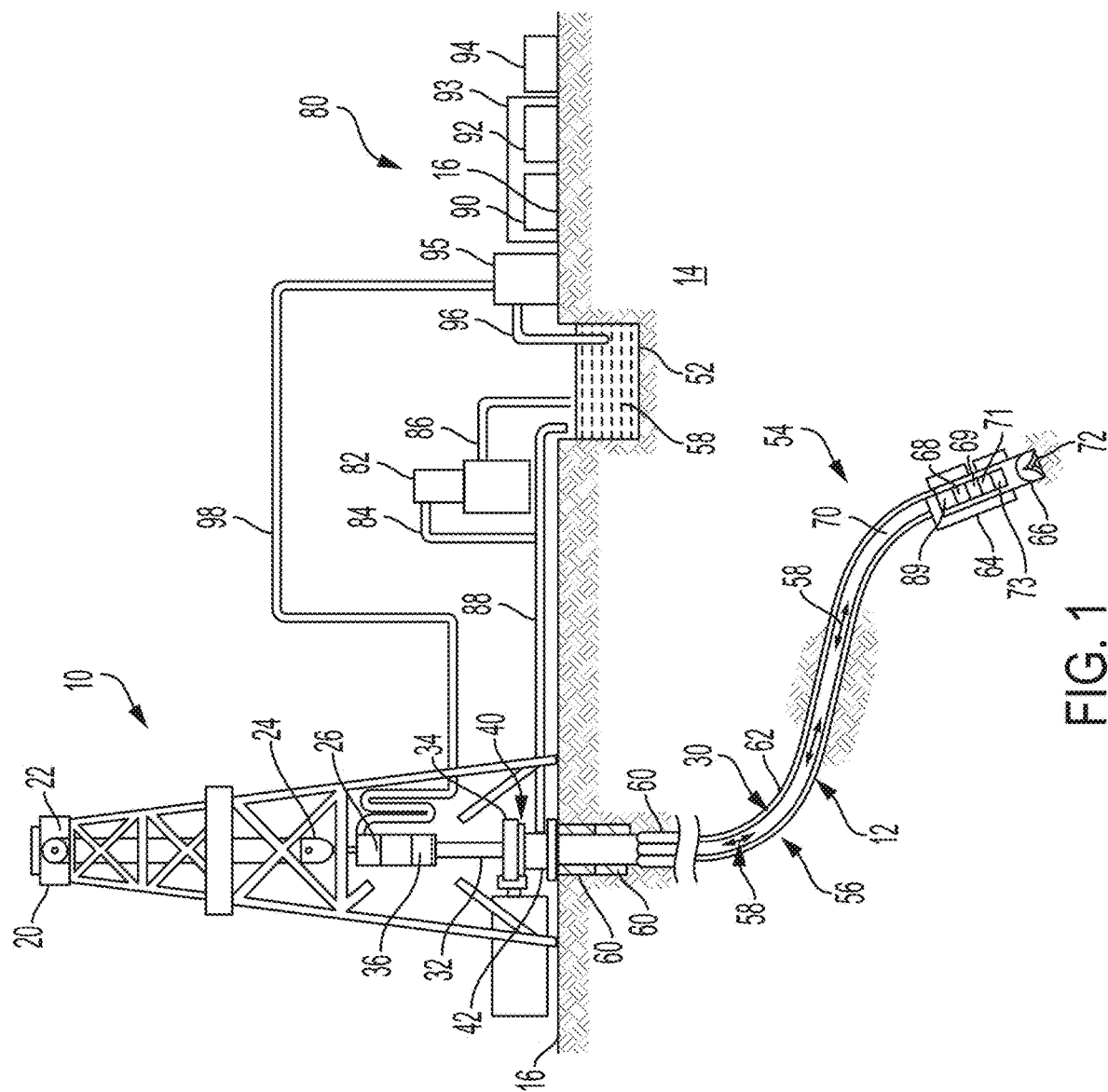
FIG. 1 is a cross-sectional view of an example of a land-based drilling system incorporating an extraction efficiency measurement system according to some aspects of the present disclosure.

Certain aspects and features relate to measuring the efficiency of an extraction system. An extractor can have an inlet channel to receive drilling fluid flowed from a wellbore. The drilling fluid can include chemical species, such as hydrocarbons, that can form bubbles within the drilling fluid, causing a mud column in the wellbore to have a lower pressure. Verifying the efficiency of the extraction system can ensure the wellbore drilling process operates efficiently. Samples of the drilling fluid can be taken at the inlet channel and at the outlet channel of the extraction system. The samples can be injected into an extraction device such as steam still to extract chemical species such as gas from the drilling fluid samples. Both volumes of extracted chemical species can be analyzed to determine the level of chemical species of interest such as hydrocarbons present within each drilling fluid sample. By comparing the level of hydrocarbons in the drilling fluid sample retrieved from the inlet channel to the level of hydrocarbons in the drilling fluid sample retrieved from the outlet channel, an efficiency value of the extraction system can be determined.

Drilling fluid can be circulated throughout a wellbore to facilitate a drilling operation. Drilling fluid can remove drill cuttings from the wellbore, cool and lubricate a drill bit, provide structural support to the drill pipe and drill bit, and form a hydrostatic mud column to maintain the structure of the wellbore walls and to prevent well kicks from occurring. Drilling fluids may be water-based or oil-based and may sometimes be in the form of an emulsion.

Drilling fluids can be analyzed to measure gaseous compounds, including hydrocarbons being expelled from a wellbore, in the course of a drilling operation. Measuring gas levels within drilling fluids can be valuable for wellbore drilling and planning. For example, analysis of gasses and their removal from a wellbore through a degasser can help a well operator determine the geological profile of a subterranean formation penetrated by the wellbore. Measurement of gasses can help quantify the amount of hydrocarbons that are present within a reservoir.

An extraction system can extract chemical species of interest such as hydrocarbons in the form of gas, liquid, or solids from the drilling fluid with a certain efficiency rate. Efficiency can refer to the fraction of a chemical species withdrawn from a drilling fluid compared to the amount of chemical species originally present in the drilling fluid. Extraction can often be incomplete, and the actual extent of extraction can be difficult to determine accurately. Incomplete extraction of a chemical species from a drilling fluid can lead to inaccurately determining the amount of hydrocarbons present in the drilling fluid, which can lead to incorrectly analyzing the subterranean profile. Determining the quantity of chemical species present in a drilling fluid inadequately can cause safety issues and costly drilling processes. For example, an influx of hydrocarbon can help a well operator determine if a drilling operation was performed correctly. Specifically, the identity and amount of a gas extracted by a degasser can help a well operator determine if a reservoir has been reached during drilling.

Some examples of the present disclosure can provide a way of validating the efficiency of a chemical species extraction system for processing various kinds of drilling fluids. One or more steam stills or other extraction systems or devices can be used to extract chemical species such as hydrocarbons from drilling fluid samples taken before entering the extraction system and after leaving the extraction system. Quantitative and qualitative chemical species measurements can be taken on the extracted species concentration, volume, mass, density, or similar to determine the amount of chemical species of interest, such as hydrocarbons, present before and after being extracted by the extraction system. The measurements of the samples taken can be compared to determine an operating efficiency of the degasser.

In one example, a first sample of drilling fluid, or mud, can be retrieved from or prior to the inlet channel of the extraction system. Using a steam still or other chemical species extraction device, the chemical species within the drilling fluid sample can be extracted. A chemical species analyzing device can analyze the gas to determine the level of chemical species of interest such as hydrocarbons present in the first drilling fluid sample. A subsequent drilling fluid sample can be retrieved from the processed drilling fluid at or after the outlet channel of the extraction system. The same procedures can be used to inject the processed drilling fluid sample into a steam still or other chemical species extraction device for extraction followed by analysis of the extracted chemical species to determine the level of chemical species of interest such as hydrocarbons present. An efficiency rating of the extraction system can be determined by computing a ratio of species present in the first sample to species present in the second sample.

This efficiency determination can be performed using any mud type such that the drilling fluid being flowed through the wellbore can be tested regardless of the contents of the drilling fluid as long as drilling fluid contains detectable and extractable chemical species. The detectable and extractable chemical species may exist due to a drilling operation, due to artificially mixing the drilling fluid with a form of gas fluid or solids, or due to a result of a chemical reaction.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of a land-based drilling system incorporating a extraction efficiency measurement system 80 according to one example. The degasser efficiency measurement system 80 can include an extraction device 90 (e.g., a steam still) and a chemical species analysis device 92 (e.g., a gas, liquid, or solids analyzing device). The extraction device 90 can extract gas, liquid, or solids from drilling fluid samples taken at input and output ports of an extraction system used in mud logging, such as a degasser 82. The chemical species analysis device 92 can measure the level of chemical species of interest, such as hydrocarbons or other gas, liquid, or solids, from the drilling fluid samples to determine the extraction efficiency of the degasser 82 within a mud logging system. In an example, the extraction device 90 and the chemical species analysis device 92 are located within a mud logging unit 93.

As used herein, the degasser 82 may be an example of an extraction device or equipment. Other types of gas, liquid, or solid extraction systems based on any mechanical, thermal, or chemical principles of operation may be used in place of, or in addition to, the degasser 82. Further, while the chemical species analysis devices 92 are described herein, any other gas, liquid, or solid chemical species analyzers, detectors, sensors, or measurement systems may also be used in place or in addition to the chemical species analysis device 92. Similarly, the terms "gas level" and "level of hydrocarbons" are examples of what is measured by the chemical species analysis devices 92, but other chemical species qualitative or quantitative measures such as volume, mass, density, concentration, or ratio may also be used in addition to or in place of the gas level or level of hydrocarbons. Further, the term hydrocarbon is used herein as an example of a chemical species of interest. Other extractable or detectable chemical species of interest in any physical form (e.g., gas, liquid, or solid) and in any chemical form may also be extracted or detected in place of or in addition to the hydrocarbons.

The wellbore drilling system 10 can be used to create a wellbore 12 extending through various earth strata in an oil and gas formation 14 (e.g., subterranean formation) located below the earth's surface 16. The wellbore 12 may be formed of a single bore or multiple bores extending into the formation 14, and disposed in any orientation. The wellbore drilling system 10 can include a derrick or drilling rig 20. The drilling rig 20 may include a hoisting apparatus 22, a travel block 24, and a swivel 26 for raising and lowering casing, drill pipe, coiled tubing, and other types of pipe or tubing strings or other types of conveyance vehicles, such as wireline, slickline, and the like. The conveyance vehicle that is the drill string 30 can be a substantially tubular, axially-extending drill string formed of a drill pipe joints coupled together end-to-end.

The drilling rig 20 may include a kelly 32, a rotary table 34, and other equipment associated with rotation or translation of drill string 30 within the wellbore 12. For some applications, the drilling rig 20 may also include a top drive unit 36. The drilling rig 20 may be located proximate to a wellhead 40, as shown in FIG. 1, or spaced apart from the wellhead 40, such as in the case of an offshore arrangement. One or more pressure control devices 42, such as blowout preventers ("BOPs") and other equipment associated with drilling a wellbore may also be provided at wellhead 40 or elsewhere in the wellbore drilling system 10. Although the wellbore drilling system 10 of FIG. 1 is illustrated as being a land-based drilling system, the wellbore drilling system 10 may be deployed offshore.

A drilling or service fluid source 52 may supply a drilling fluid 58 pumped to the upper end of the drill string 30 and flowed through the drill string 30. The drilling fluid source 52 may supply any fluid utilized in wellbore operations, including drilling fluid, cementious slurry, acidizing fluid, liquid water, steam or some other type of fluid.

Wellbore drilling system 10 may have a pipe system 56. For purposes of this disclosure, pipe system 56 may include casing, risers, tubing, drill strings, subs, heads or any other pipes, tubes or equipment that attaches to the foregoing, such as the drill string 30, as well as the wellbore and laterals in which the pipes, casing, and strings may be deployed. In this regard, the pipe system 56 may include one or more casing strings 60 cemented in the wellbore 12, such as the surface, intermediate, and casing strings 60 shown in FIG. 1. An annulus 62 is formed between the walls of sets of adjacent tubular components, such as concentric casing strings 60 or the exterior of drill string 30 and the inside wall of the wellbore 12 or the casing string 60.

Where the subsurface equipment 54 is used for drilling and the conveyance vehicle is a drill string 30, the lower end of the drill string 30 may include a bottom hole assembly 64, which may carry at a distal end a drill bit 66. During drilling operations, a weight-on-bit is applied as the drill bit 66 is rotated, thereby enabling the drill bit 66 to engage the formation 14 and drill the wellbore 12 along a predetermined path toward a target zone. In general, the drill bit 66 may be rotated with the drill string 30 from the drilling rig 20 with the top drive unit 36 or the rotary table 34, or with a downhole mud motor 68 within the bottom hole assembly 64.

The bottom hole assembly 64 or the drill string 30 may include various other tools, including a power source 69, mechanical subs 71 such as directional drilling subs, and measurement equipment 73, such as measurement while drilling (MWD) or logging while drilling (LWD) instruments, sensors, circuits, or other equipment to provide information about the wellbore 12 or the formation 14, such as logging or measurement data from the wellbore 12.

Measurement data and other information from the tools may be communicated using electrical signals, acoustic signals, or other telemetry that can be converted to electrical signals at the drilling rig 20 to, among other things, monitor the performance of the drill string 30, the bottom hole assembly 64, and the associated drill bit 66, as well as monitor the conditions of the environment to which the bottom hole assembly 64 is subjected (e.g., drilling fluid 58 flow rate).

The drilling fluid 58 may be pumped to the upper end of drill string 30 and flow through a longitudinal interior 70 of the drill string 30, through the bottom hole assembly 64, and exit from nozzles formed in the drill bit 66. At the bottom end 72 of the wellbore 12, the drilling fluid 58 may mix with formation cuttings, formation fluids (e.g., fluids containing gasses and hydrocarbons) and other downhole fluids and debris. The drilling fluid mixture may then flow upwardly through an annulus 62 to return formation cuttings and other downhole debris to the surface 16.

In some examples, formation fluid containing gasses and hydrocarbons can leak into the annulus 62 to come into contact and mix with the drilling fluid 58. The gasses in the drilling fluid 58 can introduce bubbles that can lower the pressure in a mud column created by the flow of the drilling fluid 58 throughout the wellbore 12. If pressure within the annulus 62 drops below a certain level, a well kick, or blowout, can occur that can interrupt the drilling process, increase costs, and reduce the amount of hydrocarbons ultimately retrieved. To detect a potential kick condition early, the extraction system can detect an excess hydrocarbons condition of the drilling fluid that would typically be subsequently detected by analyzers. The extraction efficiency measurement system provides a measured value that the extraction system in use is functional and operating within acceptable ranges.

The chemical species extraction efficiency measurement system 80 can include the extraction device 90 and the chemical species analysis device 92 as part of the mud logging unit 93. The degasser 82 can include a drilling fluid inlet 84, which receives a portion of the drilling fluid 58 returning to the drilling fluid source 58 from a drilling fluid return path 88, and a drilling fluid outlet 86 that returns the drilling fluid to 58 to the drilling fluid source 52. The drilling fluid 58 containing gasses and hydrocarbons can travel through the annulus 62 toward the surface 16. At the surface 16, the drilling fluid 58 can be returned to the drilling fluid source 52 through the drilling fluid return path 88. Further, a rig pump 95 may retrieve the drilling fluid 58 from the drilling fluid source 52 at a rig pump inlet 96 and provide the drilling fluid 58 back to the drill string 30 using a rig pump outlet 98.

In an example, an additional degasser 82, or other extractor device, may be positioned to analyze the drilling fluid 58 from the drilling fluid source 52 prior to the drilling fluid 58 being pumped back into the drill string 30 by the rig pump 95. The additional degasser 82 may be able to subtract background gas that is present in the drilling fluid 58 of the drilling fluid source 52 prior to insertion of the drilling fluid 58 back into the drill string 30. In this manner, the additional degasser 82 may be placed along a drilling fluid path at a location prior to the rig pump 95. Analysis tools, such as the chemical species extraction efficiency measurement system 80, may analyze the chemical species extracted from the drilling fluid 58 by the additional degasser 82.

To ensure that mud logging is performed as intended, an efficiency of the degasser 82 can be determined. A drilling fluid sample can be retrieved at the drilling fluid inlet 84 before the drilling fluid 58 enters the degasser 82. A second drilling fluid sample can be retrieved at the drilling fluid outlet 86 after the drilling fluid 58 exits the degasser 82. The first drilling fluid sample and the second drilling fluid sample may be delivered to the extraction device 90 using separate lines (not illustrated) from the drilling fluid inlet 82 and the drilling fluid outlet 86. In one or more examples, the mud logging unit 93 may be positioned adjacent to or within the degasser 82. In another example, an operator of the mud logging unit 93 may collect the first and second drilling fluid samples and provide the first and second drilling fluid samples to the mud logging unit 93. The first drilling fluid sample can be injected into the extraction device 90, which can be a steam still, to separate hydrocarbons from the drilling fluid 58. The second drilling fluid sample can be injected into the same extraction device 90 or a second degassing device to separate any remaining hydrocarbons from the drilling fluid 58 after the drilling fluid 58 was degassed by the degasser 82. The volume of gas extracted from the first drilling fluid sample and the volume of gas separated from the second drilling fluid sample can be analyzed by the chemical species analysis device 92. The gas analysis results can be compared to determine an operating efficiency of the degasser 82 such that the mud logging unit 93 is able to perform accurate mud logging operations.

In some examples, an efficiency of the chemical species extraction system may be verified in a laboratory or testing environment outside the wellbore drilling system 10 for verification and test purposes or post-manufacturing quality control. In such an example, gas, liquid, or solid hydrocarbons can be introduced to the degasser in a controlled environment to determine the percentage of hydrocarbons reduced by the degasser.

In some examples, an agitator 94 may be used to vibrate or otherwise mix one or more volumes of non-homogeneous drilling fluid samples. Drilling fluid samples may become sedentary and layers of varying densities may begin to form throughout the volume of drilling fluid after a period has passed. Agitating drilling fluid samples prior to injecting the samples into the extraction device 90 can remove effects of testing a non-homogeneous volume of drilling fluid 58 for determining efficiency of the degasser 82. In an example, the agitator 94 may be included as part of the mud logging unit 93.

Figure 2:
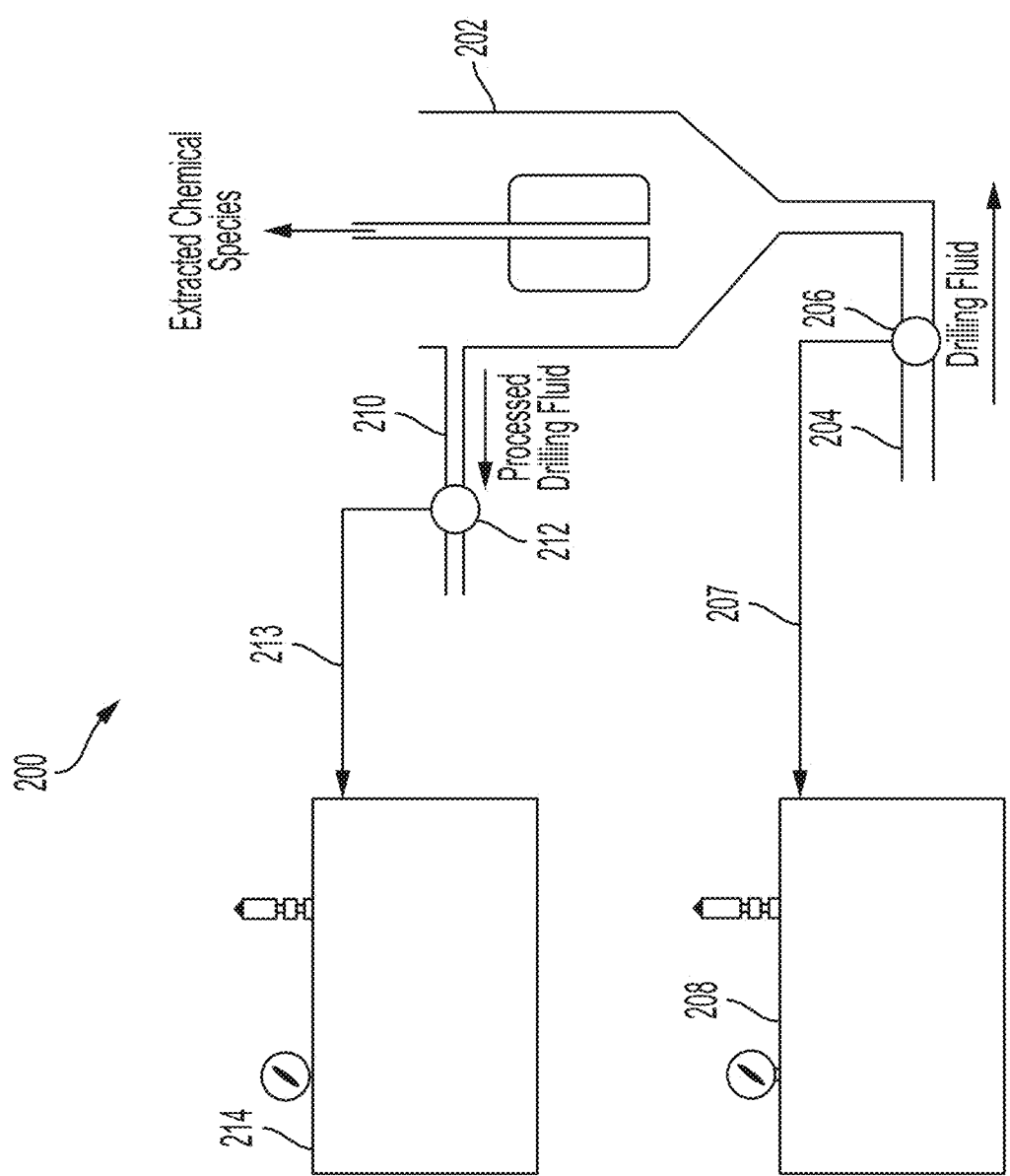
FIG. 2 is a cross-sectional view of an example of an extraction efficiency measurement system according to some aspects of the present disclosure.

FIG. 2 is a cross-sectional view of a chemical species extraction efficiency measurement system 200 according to one example. The chemical species extraction efficiency measurement system 200, such as the chemical species extraction efficiency measurement system 80 of FIG. 1, can include at least one alternative extraction device, such as the extraction device 214, and a chemical species analyzing device, which may be a gas, liquid, or solids analyzing device such as the chemical species analyzing device 92 described above with respect to FIG. 1. Examples can perform a verification test to determine the functional efficiency of a chemical species extraction system 202, such as the degasser 82 described above with respect to FIG. 1.

The chemical species extraction system 202 can be a device used by a mud logging service provider that can continuously separate gasses from drilling fluid during the operation of a wellbore drilling environment (e.g., modular EAGLE™). The chemical species extraction system 202 can remove gasses including hydrocarbons from drilling fluid through a variety of methods including (i) expanding the size of the gas bubbles within the drilling fluid by applying a vacuum, and (ii) increasing the surface area available to the mud through the use of cascading baffle plates so that the bubbles have a higher exposure to escape. The chemical species extraction system 202 can be evaluated for efficiency.

An alternative chemical species extraction device may be any other device other than the illustrated chemical species extraction system 202, such as the extraction device 90 described above with respect to FIG. 1. The alternative chemical species extraction device may also be evaluated for efficiency. The alternative extraction device can be used to extract chemical species such as hydrocarbons from drilling fluid. For example, an extraction device can be steam still that can separate gas from a liquid or slurry. A steam still can be used to separate gas from smaller volumes of drilling fluid in an offline configuration for diagnostic purposes, as compared to the chemical species extraction device 202 that can separate chemical species from drilling fluid in an online-configuration within an operating wellbore drilling environment.

A chemical species analyzing device can receive the volumes of gas, liquid, or solids that are extracted from the drilling fluid samples by the extraction device. The chemical species analyzing device can determine the efficiency of an extractor by analyzing and comparing levels of chemical species, such as hydrocarbons, present in the received volumes of a sample. The chemical species analyzing device can be, but is not limited to equipment to quantitatively or qualitatively measure: characteristics of a gaseous volume (e.g., chromatograph, total hydrocarbon analyzer, mass spectrometer, etc.); characteristics of a liquid volume (e.g., via gasification of matter, by direct liquid chromatography, or other suitable measurement devices); characteristics of solid volume analysis equipment (e.g., by liquefaction of solids, gasification of solids, direct solid measurement, or using other suitable devices); or characteristics of a combination of any of the three matter phases in either physical or organic form. The analysis provided of a chemical species analyzing device can include a determination of chemical species qualitative or quantitative measures such as volume, mass, density, concentration or ratio within a given volume, that can be extrapolated to determine characteristics of a formation fluid reservoir.

Referring to the components illustrated in FIG. 2, the extractor 202 can receive drilling fluid from a drilling fluid inlet 204, such as the drilling fluid inlet 84 described above with respect to FIG. 1. The drilling fluid conveyed by the drilling fluid inlet 204 can contain chemical species of interest such as hydrocarbons that are to be extracted by the extractor 202. The drilling fluid can enter the extractor 202 to extract chemical species of interest from the drilling fluid. The extracted chemical species can be released from the inner chamber of the extractor 202, and the processed drilling fluid can be conveyed to a drilling fluid outlet 210, such as the drilling fluid outlet 86 described above with respect to FIG. 1.

As the sample stream of drilling fluid flows through the drilling fluid inlet 204 towards the inner chambers of the extractor 202, the drilling fluid can pass an access port 206. As the processed drilling fluid flows through the drilling fluid outlet 210 out from the extractor 202, the processed drilling fluid can pass an access port 212. The access ports 206, 212 can allow for a volume of drilling fluid to be retrieved from the drilling fluid inlet 204 and drilling fluid outlet respectively, where those volumes of drilling fluid can be used as representative samples of drilling fluid for extraction efficiency verification. The access ports 206, 212 can be any conveyance means conceivable by one of ordinary skill in the relevant field of technology to allow drilling fluid to be removed inline from the drilling fluid inlet 204 and drilling fluid outlet 210, such as a porthole or pump operating a check valve connected to an exterior reservoir. A user may manually retrieve the drilling fluid sample from the access ports 206, 212, as indicated by arrows 207 and 213. In some examples, the arrows 207 and 213 may represent drilling fluid retrieval from the access ports 206, 212 that is automated by a computer system controlling various pumps, valves, and transmission lines electronically or hydraulically.

The sample of drilling fluid retrieved from the access port 206 can be injected into an extraction device 208, such as the extraction device 90 described above with respect to FIG. 1, to separate hydrocarbons or chemical species of interest from the drilling fluid. The sample of drilling fluid retrieved from the access port 212 can be injected into an extraction device 214, such as the extraction device 90 or an additional extraction device of the mud logging unit 93 not shown in FIG. 1, to separate hydrocarbons or chemical species of interest from the processed drilling fluid. The volume of chemical species separated from the drilling fluid by the extraction device 208 and the volume of chemical species separated from the drilling fluid by the extraction device 214 can be analyzed separately using the chemical species analyzing device 92 described above with respect to FIG. 1. The sample of drilling fluid retrieved from the access port 206 can be expected to include a higher concentration of hydrocarbons or chemical species of interest than the sample of drilling fluid retrieved from the access port 212 because the extractor 202 extracted some chemical species before conveying the drilling fluid into the drilling fluid outlet 210. Further, the samples retrieved from the access port 206 and the access port 212 may be agitated by the agitator 94, which is describe above with respect to FIG. 1, prior to analysis by the species analyzing device 92.

Measuring the two volumes of chemical species derived from the drilling fluid samples taken at the access ports 206, 212 can be used to calculate the efficiency of the extractor 202, where the efficiency value is a ratio describing what percentage of chemical species of interest the extractor 202 was able to extract from the drilling fluid. The efficiency of extraction can be calculated using the following equation: ((chemical species of interest reading before extraction−chemical species of interest reading after extraction)/chemical species of interest reading before extraction)*100. Thus, the calculated ratio can represent how effective the degasser 202 was at removing hydrocarbons from the drilling fluid. For example, a drilling fluid sample taken at the access port 206 can have a separated and analyzed gas volume of 500 ppm, and a drilling fluid sample taken at the access port 212 can have a separated and analyzed gas volume of 400 ppm. The calculated efficiency of the degasser 202 can be 20% efficient (e.g., ((500 ppm−400 ppm)/500 ppm)*100=20%).

The process for determining an efficiency rating of the extractor 202 according to some examples can be performed in a live environment, such as during a wellbore drilling operation, or within a debugging or laboratory environment, such as during a quality control test. In the live environment of a wellbore drilling operation, the extraction system can draw a sample of drilling fluid during active drilling operations as illustrated in FIG. 1. In a laboratory environment, the extractor 202 can be isolated and disconnected from a wellbore drilling fluid flow path in a standalone test configuration. The extractor 202 can be injected with a known volume of gas, liquid, or solid phase of the chemical species of interest. By controlling the exact volume or weight of the chemical species of interest being injected into the extractor 202, the resulting comparison between the analyzed gas, liquid, or solid samples from the access ports 206, 212 can be more accurate. In both live and laboratory environments, verification of the efficiency of an extractor can be performed in an offline configuration as opposed to an online configuration. An online configuration includes measuring the concentration profiles of the chemical species within drilling fluids using equipment installed as parallel add-ons to the flow path of the drilling fluid through the extractor.

An offline configuration can include capturing drilling fluid samples from the actively operating extraction system, and performing the chemical species separation then performing volume or mass analysis independently, or offline, from the operation of the extractor. This allows for the elimination of a calibration steps that is required for an online efficiency determination. Further, an offline analysis can allow any type of drilling fluid to be analyzed without the need for controlling the drilling fluid extraction conditions.

In some examples, a single extraction device can be used to separate the hydrocarbons from the drilling fluid for both samples taken at the access ports 206, 212. This is because the drilling fluid may often not exhibit extreme changes in hydrocarbon concentrations within a certain period. For example, a drilling fluid may have a consistent hydrocarbon concentration over a period of ten minutes. Assuming the drilling fluid samples from the access ports 206, 212 are taken in order and within that period, then the samples should be representative of the drilling fluid within that period and a single extraction device may be used instead of two extraction devices 208, 214.

Testing conditions can be maintained throughout the efficiency testing of the degasser 202 to ensure accurate and controlled measurements are performed. Uncontrolled testing environments may result in inaccurate efficiency determinations. For example, a sample of drilling fluid can be taken at the access port 212 an hour after the sample of drilling fluid is taken at the access port 206. The captured sample from the access port 212 may correspond to a different volume of drilling fluid having a different initial hydrocarbon or chemical species of interest concentration profile than the volume of drilling fluid taken at the access port 206 an hour prior. This situation may occur during a blowout, or upon reaching a reservoir while drilling the wellbore. Additionally, the excess time between sample retrievals can cause the first sample to cool, which can affect the characteristics of the drilling fluid, and, in turn, adversely affect the way the extraction device 208 and chemical species analyzing device process the sample. Testing conditions and guidelines can be maintained to ensure as few variables are introduced into the testing environment, such as substantially contemporaneously retrieving the sample from the access port 206 followed by the sample from the access port 212.

As another example of an uncontrolled testing environment that may result in inaccurate efficiency determinations, extracting the drilling fluid samples from the access ports 206, 212 simultaneously may result in the gas analysis being based on initial volumes of drilling fluids having different hydrocarbon concentration profiles. This can be caused by an operation throughput time, or lag time, for the chemical species extraction system 202 to process a volume of drilling fluid. For example, the extractor 202 may process a given volume of drilling fluid in five minutes from entrance at the drilling fluid inlet 204 to exit at the drilling fluid outlet 210. If a sample is taken at the access port 212 before the five-minute lag time has transpired, the sample may not correspond to the same drilling fluid volume as the sample taken at the access port 206, therefore skewing the efficiency calculation.

A lag time can be calculated to prevent wellbore operators from retrieving drilling fluid samples at incorrect times. Lag times may vary for different types of extraction systems, but can be calculated before extraction systems are implemented within an active wellbore drilling environment. For example, the extractor 202 can be operated in a stable system such as a laboratory testing environment where the fluid flow into the extractor 202 can be controlled. Lag time may differentiate based on the viscosity of the drilling fluid and density, among other drilling fluid characteristics, that can be identified upon analysis of a first sample, where determination of those characteristics can be used to estimate an expected lag time. Estimating lag time can allow wellbore operators to retrieve drilling fluid samples from the access ports 206, 212 at appropriate times to ensure both samples correspond to the same volume of drilling fluid.

Figure 3:
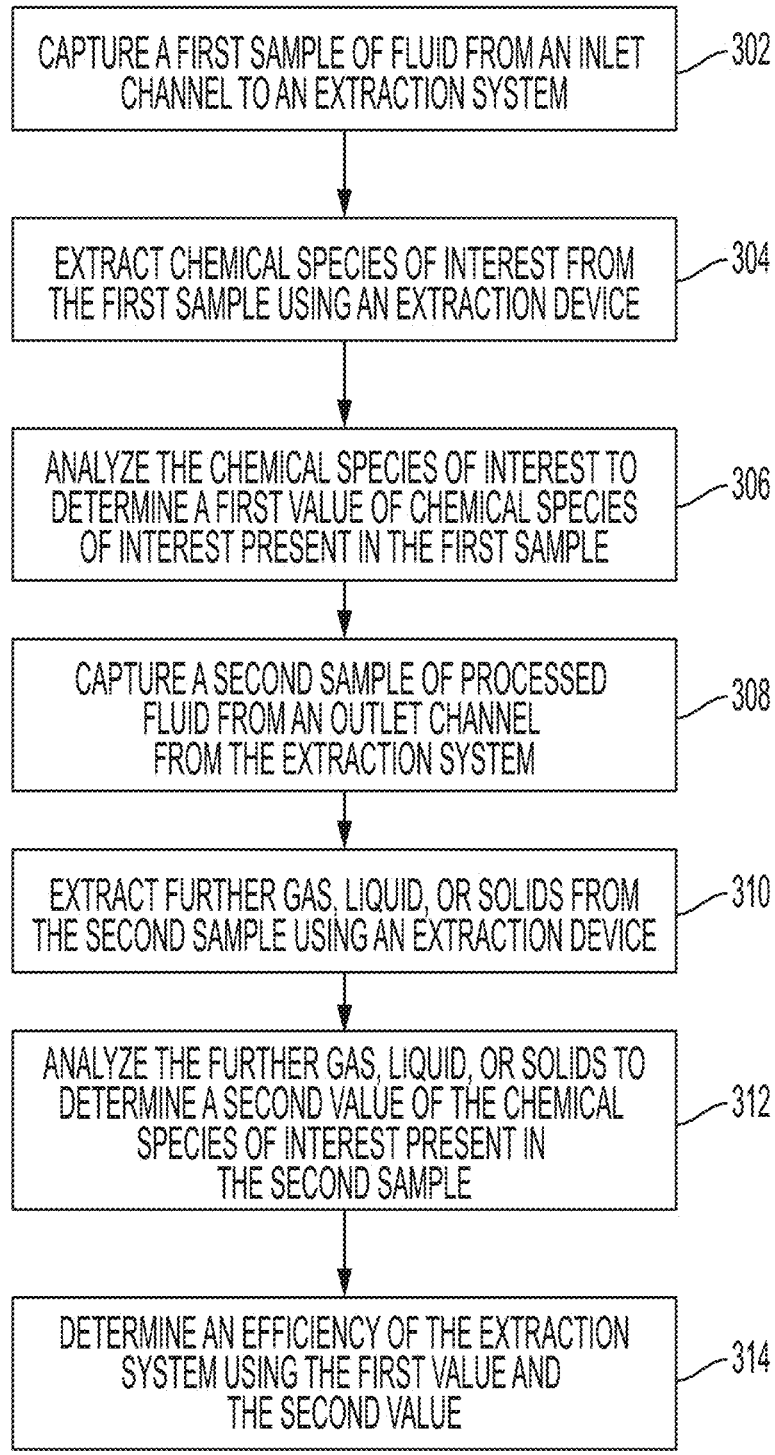
FIG. 3 is a flowchart of a process for measuring the efficiency of an extraction system according to some aspects of the present disclosure.

FIG. 3 is a flowchart of a process for measuring the efficiency of an extraction system according to one example. Some processes for measuring the efficiency of the extraction system can be described according to previous examples. The processes described for measuring the efficiency of the extraction system can be implemented in a wellbore environment or a testing or laboratory environment.

In block 302, a first sample of fluid is captured from an inlet channel to an extraction system. A wellbore operator can remove fluid from an access port of the inlet channel. The sample of fluid retrieved from the inlet channel of the extraction system can be drilling fluid sourced from within a wellbore. The first sample can include a concentration of a chemical species of interest that leaked into the drilling fluid in the wellbore from fluid-bearing formations.

In block 304, a chemical species of interest is extracted from the first sample using an extraction device. The extraction device, which can be a steam still, can extract a gas from the first sample. The extraction device can separate gas, liquid, or solids from the drilling fluid. The extraction device can perform the extraction of gas, liquid, or solids from the drilling fluid in an offline configuration such that the extraction device may operate at a mud logging unit or a laboratory located remote from the wellbore.

In block 306, the chemical species are analyzed to determine a first value of chemical species of interest such as hydrocarbons present in the first sample. A chemical species analyzer can determine the first concentration, volume, mass, density, or similar quantitative or qualitative values of the chemical species of interest present in the first sample. Having been separated from the drilling fluid in block 304, the extracted volume of gas, liquid, or solids can be analyzed to determine a concentration, volume, mass, density, or similar quantitative or qualitative value of the chemical species of interest that were present in the first sample being captured at the inlet channel. This first value can correspond to the amount of chemical species of interest such as hydrocarbons present in the drilling fluid prior to being extracted by the extractor. The first value can act as a point of reference when being compared against a value of the chemical species of interest, such as hydrocarbons, present in the drilling fluid after being processed by the extractor.

In block 308, a second sample of processed fluid is captured from an outlet channel from the extraction system. A wellbore operator can capture fluid from an access port of an outlet channel. The sample of fluid retrieved from the outlet channel of the extraction system can be drilling fluid that has been processed by the extraction system. The second sample can be captured from a second access port coupled to the outlet channel. The extraction system can be used to capture the chemical species of interest such as hydrocarbons present within the drilling fluid. The processed drilling fluid and resulting second sample can contain a lower amount of the captured chemical species than the drilling fluid used as the first sample. In some examples, a lag time for the extractor to process a volume of drilling fluid can be determined. The lag time can be determined by measuring a time for the volume of fluid further to exit the outlet channel subsequent to entering the inlet channel. The lag time can be used to wait until a sufficient time has passed before capturing the second sample, such that the second sample is removed at a time greater than or equal to the lag time after the first sample is removed.

In block 310, further gas, liquid, or solids are extracted from the second sample using an extraction device. The extraction device, which can be a steam still, can extract a volume or mass of gas, liquid, or solids from the second sample. The extraction device can extract gas, liquid, or solids from the drilling fluid processed by the extraction system. The extraction device can perform the extraction of the gas, liquid, or solids from the drilling fluid in an offline configuration such that an extractor may continue to operate independently in an active wellbore drilling operation where drilling fluid is flowing.

In block 312, the further gas, liquid, or solids is analyzed to determine a second concentration, volume, mass, density, or similar quantitative or qualitative value of chemical species of interest, such as hydrocarbons, present in the second sample. The gas liquid, or solids extracted from the second sample is analyzed to determine a second concentration, volume, mass, density, or similar quantitative or qualitative value of the chemical species of interest, such as hydrocarbons, present in the second sample. The chemical species analyzer can determine the second concentration, volume, mass, density, or similar quantitative or qualitative value of the chemical species of interest, such as hydrocarbons, present in the second sample. Having been separated from the processed drilling fluid in block 310, the extracted volume of gas, liquid, or solids can be analyzed to determine a concentration, volume, mass, density, or similar quantitative or qualitative value of the chemical species of interest, such as hydrocarbons, that were present in the second sample captured at the outlet channel. This second value can correspond to the amount of the chemical species of interest such as hydrocarbons present in the drilling fluid after being processed by the extractor.

In block 314, an efficiency of the extraction system is determined using the first value and the second value. An efficiency of the extraction system can be determined to monitor performance of the drilling operations within a wellbore environment. The efficiency of the degasser can be represented as a ratio that is calculated by subtracting the second value from the first value to determine the differential value of the chemical species of interest, such as hydrocarbon, and dividing the differential value by the first value. The efficiency of the extraction system can be used to determine whether the extraction system is operating at a high enough extraction rate within a wellbore drilling environment.

Figure 4:
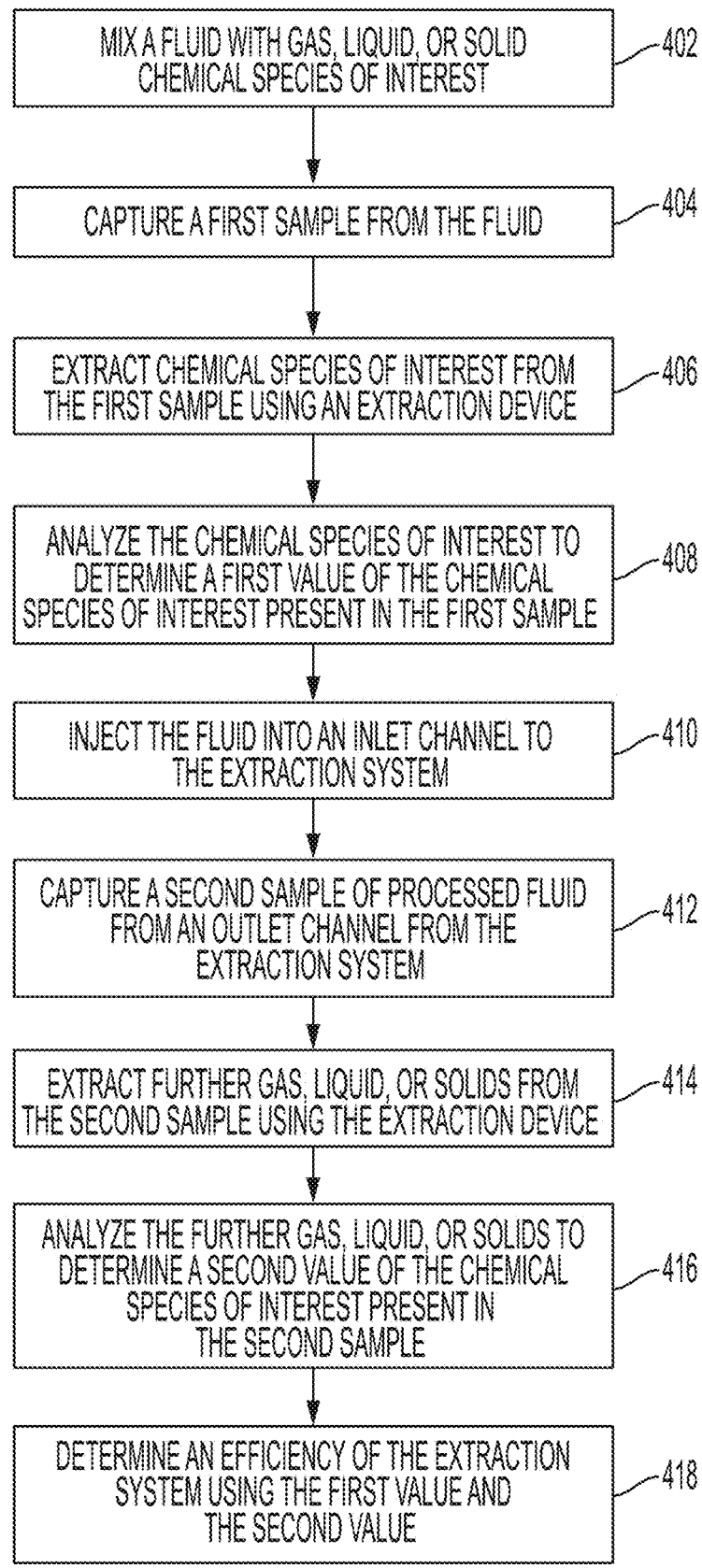
FIG. 4 is a flowchart of a process for debugging an extraction system in a test environment according to some aspects of the present disclosure.

FIG. 4 is a flowchart of a process for evaluating an extraction system for extraction efficiency in a test environment according to one example. Some processes for evaluating an extraction system in a test environment can be described according to previous examples. In a test or laboratory environment, an extraction system can be isolated and disconnected from a wellbore drilling fluid flow path in a standalone test configuration.

In block 402, a fluid is mixed with gas, liquid, or solids of a chemical species of interest, such as hydrocarbons. The extraction system, being in a test environment, may not have actual drilling fluid containing the chemical species of interest to flow to determine an efficiency of the extraction system. In place of actual drilling fluid, a test fluid can be flowed through the extraction system. The test fluid can have known amount of the chemical species of interest for purposes of the testing. In some examples, test fluids with different characteristics (e.g., viscosity or density) can be flowed through the extraction system to determine if and how the variable characteristics can affect the efficiency of the extraction system.

In block 404, a first sample of fluid is captured from the fluid. An operator can capture a sufficient fluid volume from the fluid mixed in block 402. The sample of fluid retrieved can be drilling fluid sourced from within a wellbore, or manufactured fluid designed to mimic actual drilling fluids. The first sample can include a concentration, volume, mass, density, or similar quantitative or qualitative value of the chemical species of interest.

In block 406, a chemical species of interest is extracted from the first sample using an extraction device. The extraction device, which can be a steam still, can extract a chemical species of interest from the first sample. The extraction device can separate gas, liquid, or solids from the drilling fluid. The extraction device can perform the extraction of gas, liquid, or solids from the drilling fluid in an offline configuration such that the extraction device may operate at a mud logging unit or a laboratory located remotely from a wellbore.

In block 408, the chemical species are analyzed to determine a first value of chemical species of interest present in the first sample. A chemical species analyzer can determine the first concentration, volume, mass, density, or similar quantitative or qualitative value of chemical species of interest present in the first sample. Having been separated from the drilling fluid in block 304, the extracted volume of gas, liquid, or solids can be analyzed to determine a concentration, volume, mass, density, or similar quantitative or qualitative value of the chemical species of interest that were present in the first sample being taking at the inlet channel. This first value can correspond to the amount of chemical species of interest such as hydrocarbons present in the drilling fluid prior to being extracted by the extractor. The first value can act as a point of reference when being compared against a value of the chemical species of interest such as hydrocarbons present in the drilling fluid after being processed by the extractor.

In block 410, the fluid is injected to an inlet channel to the extraction system. The extraction system can be injected with gas, liquid, or solid chemical species of interest such as hydrocarbons containing a known concentration, volume, mass, density, or similar quantitative or qualitative amounts through an inlet channel. By controlling the exact amount being injected into the extraction system, we can use the same process to compare different extraction systems from the same type or from different types.

In block 412, a second sample of processed fluid is captured from an outlet channel from the extraction system. An operator can capture fluid from an access port of an outlet channel. The sample of fluid retrieved from the outlet channel of the extraction system can be drilling fluid that has been processed by the extraction system. The second sample can be captured from a second access port coupled to the outlet channel. The extraction system can be used to capture chemical species of interest such as hydrocarbons present within the drilling fluid. The processed drilling fluid and resulting second sample can contain a lower amount of the chemical species than the drilling fluid used as the first sample. In some examples, a lag time for the extraction system to process a volume of drilling fluid can be determined. The lag time can be determined by measuring a time for the volume of fluid further to exit the outlet channel subsequent to entering the inlet channel. The lag time can be used to wait until a sufficient time has passed before capturing the second sample, such that the second sample is removed at a time greater than or equal to the lag time after the first sample is removed.

In block 414, further gas, liquid, or solids is extracted from the second sample using the extraction device. The extraction device, which can be a steam still, can extract a volume or mass of gas, liquid, or solids from the second sample. The extraction device can extract gas, liquid, or solids from the drilling fluid processed by the extraction system. The extraction device can perform the extraction of the gas, liquid, or solids from the drilling fluid in an offline configuration such that an extractor may continue to operate independently in an active wellbore drilling operation where drilling fluid is flowing.

In block 416, the further gas, liquid, or solids is analyzed to determine a second concentration, volume, mass, density, or similar quantitative or qualitative value of the chemical species of interest, such as hydrocarbons, present in the second sample. The gas liquid, or solids extracted from the second sample is analyzed to determine a second concentration, volume, mass, density, or similar quantitative or qualitative value of the chemical species of interest present in the second sample. The chemical species analyzer can determine the second concentration, volume, mass, density, or similar quantitative or qualitative value of the chemical species of interest present in the second sample. Having been separated from the processed drilling fluid in block 310, the extracted volume of gas, liquid or solids can be analyzed to determine a concentration, volume, mass, density, or similar quantitative or qualitative of the chemical species of interest that were present in the second sample being taking at the outlet channel. This second value can correspond to the amount of the chemical species of interest present in the drilling fluid after being processed by the extractor.

In block 418, an efficiency of the extraction system is determined using the first value and the second value. An efficiency of the extraction system can be determined to ensure that the extraction system is performing sufficiently. The efficiency of the extraction system can be represented as a ratio that is calculated by subtracting the second value from the first value to determine the differential value of a chemical species of interest, such as hydrocarbons, and dividing the differential value by the first value. The efficiency of the extractor can be used to determine whether the extraction system meets a quality control threshold value before being implemented within a wellbore drilling environment.

In some aspects, systems, devices, and methods measuring the efficiency of a extraction system are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: an extraction system having an inlet channel and an outlet channel to receive fluid and to output processed fluid; an extraction device positionable with respect to the extraction system to capture a first sample of fluid from the inlet channel, capture a second sample from the processed fluid from the outlet channel, and extract gas, liquid, or solids from the first sample and further gas, liquid, or solids from the second sample; and a gas, liquid, or solids analyzing device useable to analyze the gas, liquid, or solids to determine a first value of a chemical species of interest present in the first sample and to analyze the further gas, liquid, or solids to determine a second value of the chemical species of interest present in the second sample to determine an efficiency of the extraction system using the first value and the second value.

Example 2 is the system of example 1, wherein the efficiency of the extraction system is determinable by subtracting the second value from the first value to determine a chemical species differential value, and dividing the chemical species differential value by the first value.

Example 3 is the system of examples 1-2, wherein the fluid is drilling fluid obtainable from a wellbore.

Example 4 is the system of examples 1-3, wherein the extraction system is operable to remove the chemical species of interest present in the fluid such that the processed fluid contains a lower amount of the chemical species of interest than the fluid.

Example 5 is the system of examples 1-4, wherein the extraction system is positionable to process a volume of fluid over a lag time, wherein the extraction device is positionable to capture the second sample at a time greater than or equal to the lag time subsequent to the first sample being captured.

Example 6 is the system of example 5, wherein the lag time is measurable as a time for the volume of fluid further to exit the outlet channel subsequent to entering the inlet channel.

Example 7 is the system of examples 1-6, further comprising: an agitator to mix the first sample into a homogeneous consistency prior to extracting the gas, liquid, or solids from the first sample using the extraction device and to mix the second sample into a homogeneous consistency prior to extracting the further gas, liquid, or solids from the second sample using the extraction device.

Example 8 is the system of examples 1-7, wherein the first sample of fluid has been mixed with gas, liquid, or solid chemical species of interest.

Example 9 is the system of example 8, wherein the gas, liquid, or solid chemical species of interest have a known concentration, volume, mass, or density.

Example 10 is the system of examples 1-9, the first sample being removable from a first access port coupled to the inlet channel, and the second sample being removable from a second access port coupled to the outlet channel.

Example 11 is a method comprising: capturing a first sample of fluid from an inlet channel to an extraction system; extracting, using an extraction device, gas, liquid, or solids from the first sample; analyzing the gas, liquid, or solids to determine a first value of a chemical species of interest present in the first sample; capturing a second sample of processed fluid from an outlet channel from the extraction system; extracting, using the extraction device, further gas, liquid, or solids from the second sample; analyzing the further gas, liquid, or solids to determine a second value of the chemical species of interest present in the second sample; and determining an efficiency of the extraction system using the first value and the second value.

Example 12 is the method of example 11, wherein determining the efficiency of the extraction system includes calculating a ratio by subtracting the second value from the first value to determine a chemical species differential value, and dividing the chemical species differential value by the first value.

Example 13 is the method of examples 11-12, wherein the fluid is drilling fluid flowed from within a wellbore.

Example 14 is the method of examples 11-13, further comprising: processing, using the extraction system, the fluid to remove the chemical species of interest present in the fluid, wherein the processed fluid contains a lower amount of the chemical species of interest than the fluid.

Example 15 is the method of examples 11-14, further comprising: determining a lag time for the extraction system to process a volume of fluid, the second sample being captured at a time greater than or equal to the lag time subsequent to the first sample being captures.

Example 16 is the method of example 15, wherein determining the lag time includes measuring a time for the volume of fluid further to exit the outlet channel subsequent to entering the inlet channel.

Example 17 is the method of examples 11-16, wherein the extraction system comprises a degasser and the extraction device comprises a steam still.

Example 18 is the method of examples 11-17, wherein the first sample of fluid has been mixed with a gas, liquid, or solid chemical species of interest, and wherein the gas, liquid, or solid chemical species of interest comprises hydrocarbons.

Example 19 is the method of example 18, wherein the gas, liquid, or solid chemical species of interest have a known concentration, volume, mass, or density.

Example 20 is the method of examples 10-19, wherein removing the first sample includes removing the first sample from a first access port coupled to the inlet channel, and wherein removing the second sample includes removing the second sample from a second access port coupled to the outlet channel.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   an extraction system having an inlet channel and an outlet channel to receive drilling fluid and to output processed drilling fluid, the extraction system comprising a degasser or a mud-gas separator;
   an extraction device comprising one or more steam stills, wherein the one or more steam stills are positionable with respect to the extraction system to:
   capture a first sample from the drilling fluid from the inlet channel,
   capture a second sample from the processed drilling fluid from the outlet channel,
   extract gas, liquid, or solids comprising hydrocarbon material from the first sample, and
   extract further gas, liquid, or solids comprising hydrocarbon material from the second sample;
   an agitator coupled with the inlet channel and the outlet channel and positionable between the extraction system and the extraction device, wherein the agitator is configured to vibrate the first sample prior to providing the first sample to the extraction device and to vibrate the second sample prior to providing the second sample to the extraction device; and
   a gas, liquid, or solids analyzing device useable to analyze the gas, liquid, or solids to determine a first value of a chemical species of interest present in the first sample and to analyze the further gas, liquid, or solids to determine a second value of the chemical species of interest present in the second sample to determine an efficiency of the extraction system using the first value and the second value.

2. The system of claim 1, wherein the efficiency of the extraction system is determinable by subtracting the second value from the first value to determine a chemical species differential value, and dividing the chemical species differential value by the first value.

3. The system of claim 1, wherein the fluid is drilling fluid obtainable from a wellbore.

4. The system of claim 1, wherein the extraction system is operable to remove the chemical species of interest present in the fluid such that the processed fluid contains a lower amount of the chemical species of interest than the fluid.

5. The system of claim 1, wherein the extraction system is positionable to process a volume of fluid over a lag time, wherein the extraction device is positionable to capture the second sample at a time greater than or equal to the lag time subsequent to the first sample being captured.

6. The system of claim 5, wherein the lag time is measurable as a time for the volume of fluid to further exit the outlet channel subsequent to entering the inlet channel.

7. The system of claim 1, wherein the first sample has been mixed with gas, liquid, or solid chemical species of interest.

8. The system of claim 7, wherein the gas, liquid, or solid chemical species of interest have a known concentration, volume, mass, or density.

9. The system of claim 1, the first sample being removable from a first access port coupled to the inlet channel, and the second sample being removable from a second access port coupled to the outlet channel.

10. A method comprising:
    capturing a first sample of drilling fluid from an inlet channel to an extraction system that comprises a degasser or a mud-gas separator;
    vibrating the first sample of drilling fluid in an agitator prior to providing the first sample of drilling fluid to an extraction device, the agitator coupled with the inlet channel and positioned between the extraction system and the extraction device;
    extracting, using the extraction device that comprises a steam still, gas, liquid, or solids comprising hydrocarbon material from the first sample;
    analyzing the gas, liquid, or solids comprising hydrocarbon material to determine a first value of a chemical species of interest present in the first sample;
    capturing a second sample of processed drilling fluid from an outlet channel from the extraction system;
    vibrating the second sample of processed drilling fluid in the agitator prior to providing the second sample of processed drilling fluid to the extraction device;
    extracting, using the extraction device, further gas, liquid, or solids comprising hydrocarbon material from the second sample;
    analyzing the further gas, liquid, or solids comprising hydrocarbon material to determine a second value of the chemical species of interest present in the second sample; and
    determining an efficiency of the extraction system using the first value and the second value.

11. The method of claim 10, wherein determining the efficiency of the extraction system includes calculating a ratio by subtracting the second value from the first value to determine a chemical species differential value, and dividing the chemical species differential value by the first value.

12. The method of claim 10, wherein the fluid is drilling fluid flowed from within a wellbore.

13. The method of claim 10, further comprising:
processing, using the extraction system, the fluid to remove the chemical species of interest present in the fluid, wherein the processed fluid contains a lower amount of the chemical species of interest than the fluid.

14. The method of claim 10, further comprising:
determining a lag time for the extraction system to process a volume of fluid, the second sample being captured at a time greater than or equal to the lag time subsequent to the first sample being captures.

15. The method of claim 14, wherein determining the lag time includes measuring a time for the volume of fluid to further exit the outlet channel subsequent to entering the inlet channel.

16. The method of claim 10, wherein the extraction system comprises a degasser and the extraction device comprises a steam still.

17. The method of claim 10, wherein the first sample has been mixed with a gas, liquid, or solid chemical species of interest, and wherein the gas, liquid, or solid chemical species of interest comprises hydrocarbons.

18. The method of claim 17, wherein the gas, liquid, or solid chemical species of interest have a known concentration, volume, mass, or density.

19. The method of claim 10, wherein removing the first sample includes removing the first sample from a first access port coupled to the inlet channel, and wherein removing the second sample includes removing the second sample from a second access port coupled to the outlet channel.

* * * * *